(12) United States Patent
Steiner et al.

(10) Patent No.: US 6,626,362 B1
(45) Date of Patent: Sep. 30, 2003

(54) PROTECTIVE COVER FOR A HAND HELD DEVICE

(76) Inventors: Mark Steiner, 98 Valley Rd., Cos Cob, CT (US) 06807; Christopher S. Ciervo, 5 Saranac St., Brookhaven, NY (US) 11719

( * ) Notice: Subject to any disclaimer, the term of this patent is extended or adjusted under 35 U.S.C. 154(b) by 0 days.

(21) Appl. No.: 09/477,185

(22) Filed: Jan. 4, 2000

Related U.S. Application Data

(63) Continuation-in-part of application No. 29/100,680, filed on Feb. 16, 1999, now Pat. No. Des. 424,035.

(51) Int. Cl.[7] .............................. G06K 7/10; G06K 9/22
(52) U.S. Cl. .............................. 235/462.45; 235/472.01
(58) Field of Search ................... 235/472.01, 472.02, 235/462.43, 479, 482, 486, 462.45

(56) References Cited

U.S. PATENT DOCUMENTS

| | | | | |
|---|---|---|---|---|
| D352,279 S | * | 11/1994 | Foy et al. ................... D14/100 |
| 5,368,159 A | * | 11/1994 | Doria ......................... 206/320 |
| 5,388,692 A | * | 2/1995 | Withrow et al. ............. 206/320 |
| 5,539,194 A | * | 7/1996 | Miller et al. ................. 235/472 |
| D379,265 S | * | 5/1997 | Wathen et al. ............... D3/269 |
| 5,627,349 A | * | 5/1997 | Shetye et al. ................. 178/18 |
| 5,648,757 A | * | 7/1997 | Vernace et al. ............. 340/539 |
| 5,822,546 A | * | 10/1998 | George ....................... 395/281 |
| 5,859,628 A | * | 1/1999 | Ross et al. ................... 345/173 |
| 5,996,956 A | * | 12/1999 | Shawver ................... 248/309.1 |
| 6,042,478 A | * | 3/2000 | Ng .............................. 463/44 |
| D424,035 S | * | 5/2000 | Steiner et al. ............. D14/114 |

* cited by examiner

Primary Examiner—Karl D. Frech

(57) ABSTRACT

A protective cover for a personal organizer is formed as a shell of resilient material that overlies the side, rear, top and bottom surfaces of the organizer. A top wall of the shell includes a peripheral portion that overlies the edge of the front surface of the organizer such that the top, bottom and side surfaces of the organizer are received in a peripheral recess.

17 Claims, 4 Drawing Sheets

PROTECTIVE COVER FOR A HAND HELD DEVICE

REFERENCE TO RELATED APPLICATIONS

This application is a continuation-in-part of U.S. application Ser. No. 29/100,680, filed on Feb. 16, 1999, now U.S. Pat. No. D. 424,035.

BACKGROUND OF INVENTION

Personal organizers such as the Palm III® have become popular for providing information and computerized notekeeping in a highly portable way. The present invention is a protective cover for protecting a personal organizer, such as the Palm III, from damage that may occur through inadvertent dropping or collision with other items in a working environment.

It is an object of the invention to provide a resilient protective cover for a personal organizer that protects the device from damage by inadvertent dropping or collision and yet does not impede use of the device with the protective cover in place.

SUMMARY OF THE INVENTION

In accordance with the invention there is provided a protective cover for a personal organizer which has a front surface, a rear surface, two side surfaces and top and bottom end surfaces. The organizer includes a connector at one of the end surfaces and a display and operating buttons on the front surface. The protective cover comprises a shell of resilient material having a thickness in the range of one-eighth to three-eighths of an inch. The shell has a generally closed rear wall, side walls and top and bottom walls interiorly conforming to the corresponding surfaces of the organizer. A front wall of the shell has an opening allowing access to the operating buttons and viewing of the display. The front wall includes a peripheral portion substantially surrounding the opening and forming an interior recess for receiving the side, top and bottom surfaces. The peripheral portion is integral with the side walls and extends over substantially all peripheral edges of the front surface.

In a preferred embodiment the shell is formed as a single molded mode structure. The shell may also include a resilient exterior extension for receiving and holding a stylus for use in the personal organizer. The protective cover may further include a loop to enable the cover and the organizer to be easily held in the hand of a user with the loop over the hand. An opening may be provided in one end wall of the shell for allowing access to the connector. In one embodiment, wherein the personal organizer includes an optical reader on an end surface opposite the connector, the shell may be provided with an opening in a second end wall to allow use of the optical reader.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

Like reference designations in different drawings represent the same elements.

DESCRIPTION OF THE PREFERRED EMBODIMENT

While the present invention is directed at a protective cover for any hand held terminal, the preferred embodiment is directed at a protective cover for a personal organizer, such as Palm III organizer, which may have a bar code reader integrated within.

Figure 1:
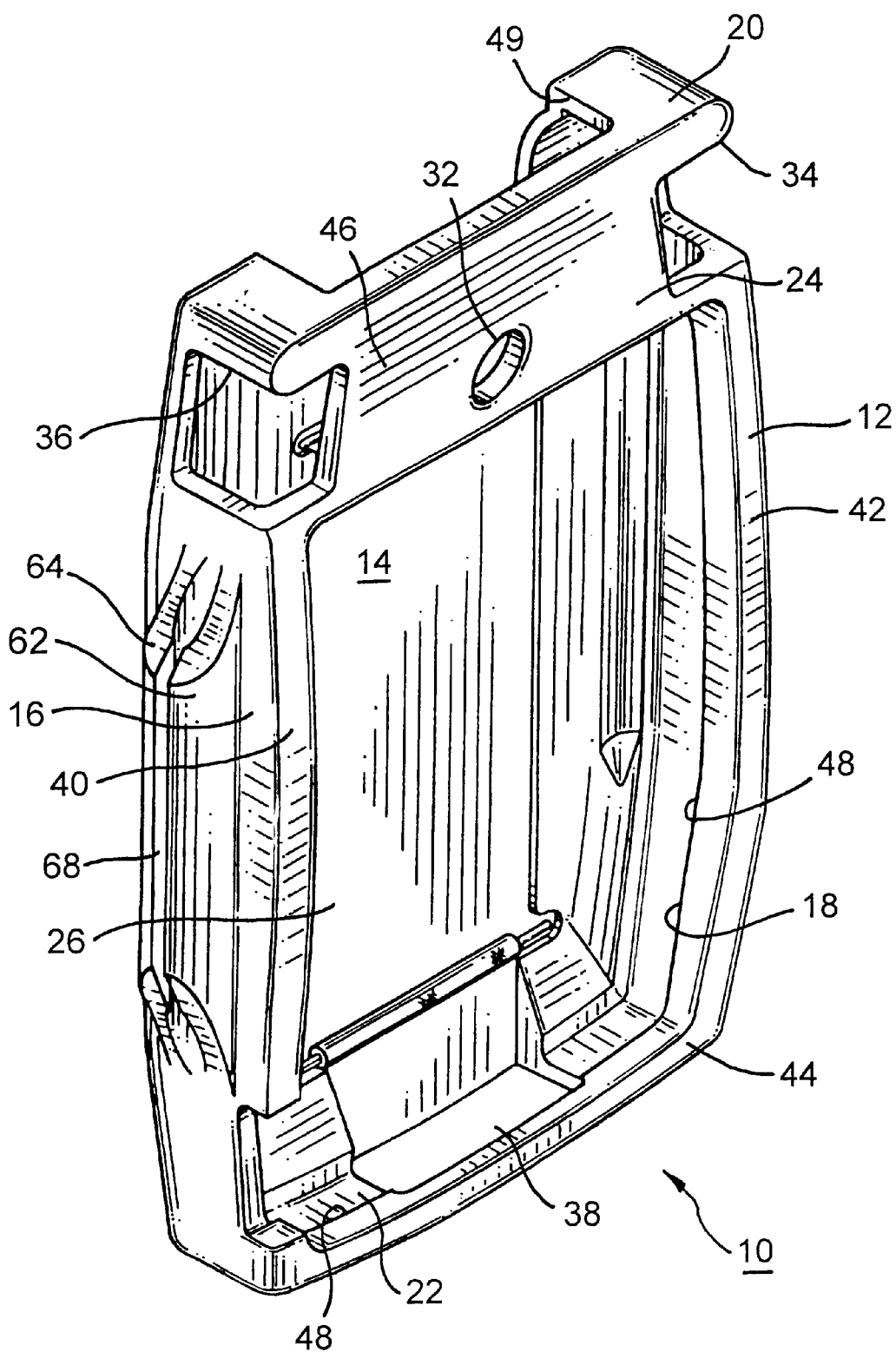
FIG. 1 is a perspective view of a protective cover in accordance with the present invention.
Figure 5:
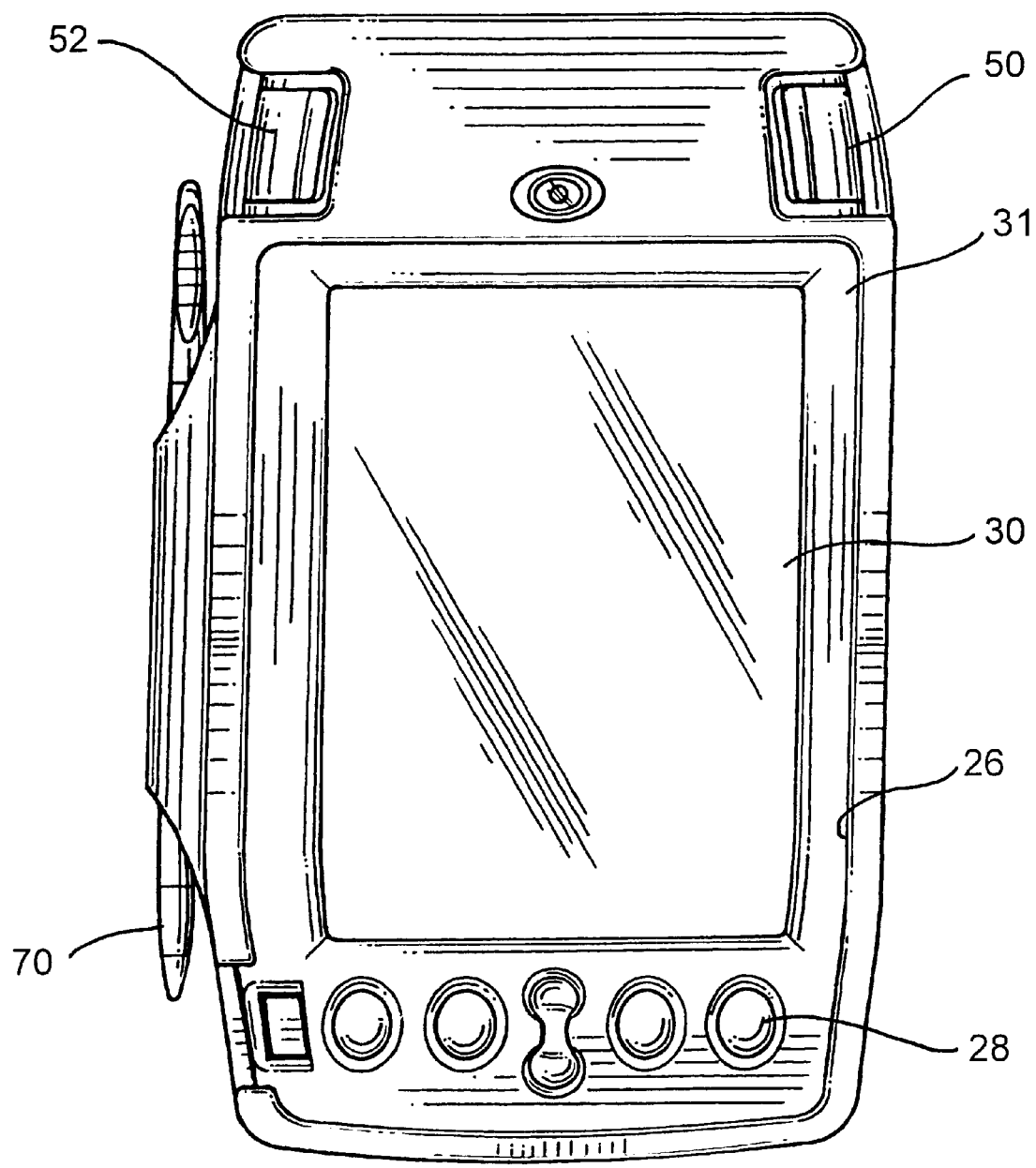
FIG. 5 is a front view of the FIG. 1 cover with a personal organizer arranged therein.
Figure 6:
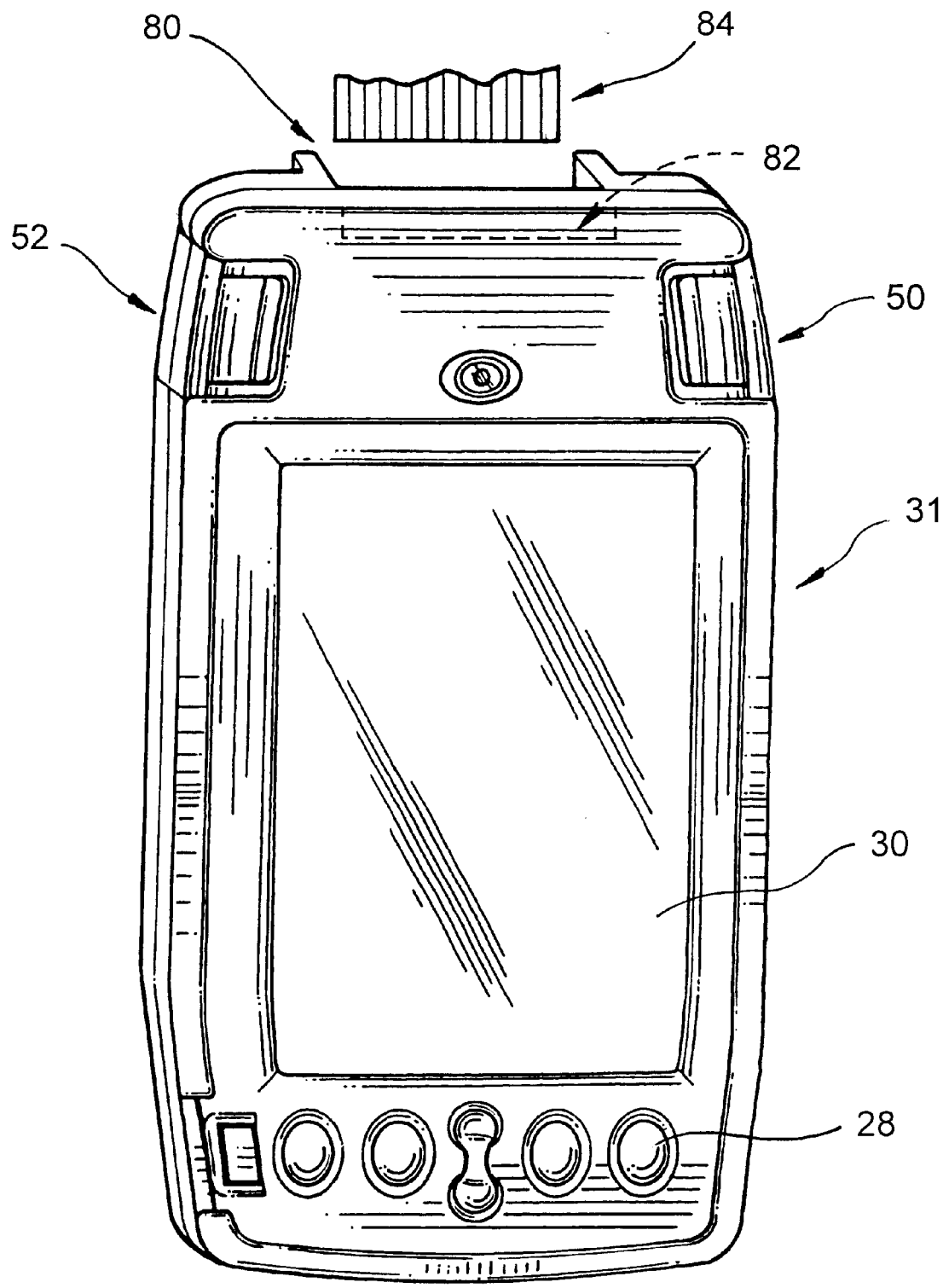
FIG. 6 is a perspective view of a hand held portable terminal with a bar code reading device integrated therein.

Referring generally to the drawings, in FIG. 1 there is shown a protective cover 10 in accordance with the invention which is fabricated from a shell 12 of resilient material, such as flexible foam plastic or rubber. In the preferred embodiment, the material used is Santoprene 8101-60, manufactured by Advanced Elastomer Systems, L.P. Shell 12 includes a rear wall 14, side walls 16 and 18, top wall 20, bottom wall 22 and a front wall 24. The walls of shell 12 are interiorly shaped to closely conform to the exterior surfaces of a personal organizer device, so that by flexing the shell 12, the personal organizer can be inserted and retained in the shell 12. For example, the top portion of an organizer may be inserted under the upper portion 46 of a front wall 24 adjoining a top wall 20, while side walls 16 and 18 are flexed so that a bottom wall 22 is in a position that allows insertion of a top portion of the organizer under upper portion 46 of the front wall 24. Once the organizer contacts top wall 20, side walls 16 and 18 can be allowed to flex into their relaxed position such that bottom wall 22 is adjoining the bottom surface of the personal organizer. Front surface 24 includes an opening 26 which is sized and positioned to allow access to operating buttons 28 and viewing of display 30 of a personal organizer 31 as shown in FIGS. 5 and 6. Other openings such as opening 32 in the front wall 24 and openings 34, 36 in the side and front walls 16, 18 and 24, may be provided as required for access to controls of the personal organizer, such as the control buttons 50 and 52 shown in FIGS. 5 and 6. An opening 38 in the bottom wall of shell 12 adjoins a connector provided on the bottom surface of personal organizer 31 such that organizer 31 can be connected to data communication and charging equipment while cover 10 is in place.

An important feature of the protective cover of the invention is the arrangement of front wall 24, side walls 16 and 18, and bottom wall 22 to provide a recess which surrounds and engages the periphery of organizer 31. In particular, the front wall 24 includes peripheral portions 40, 42, 46 and 44 which are connected to the adjoining side walls 16 and 18, top wall 20, and bottom wall 22 of shell 12 and form an interior recess 48 which surrounds organizer 31 and receives the side, top and bottom surfaces to retain the organizer in shell 12. Recess 48 extends over substantially all peripheral edges of the front surface of organizer 31 to thereby retain organizer 31 within shell 12 and to provide impact protection of the edges of organizer 31 in the event the organizer is inadvertently dropped.

The protective cover of the present invention in one embodiment is useful with a modified personal organizer 31 that includes an optical reading device, such as a bar code scanner 82, shown in FIG. 6, for reading bar codes or other machine readable indicia 84. The optical scanning device 82 is arranged to emit a bar code reading beam from the top and/or rear surfaces of the personal organizer through opening 49 in the shell. Controls of the bar code reader may be located at the side edges, near the top of the front surface, such as buttons 50 and 52 as shown in FIGS. 5 and 6. FIG. 6 depicts an organizer 3 including a bar code scanner 82 and having a window 80 to allow passage of light into and out of the scanner 82. For purposes of accommodating the optical reader, shell 12 includes an opening 49 to allow access to the optical reader and openings 34, 36 allowing access to buttons 50, 52 respectively. The optical reader may be a laser-based bar code scanner, including non-retroreflective and retroreflective scanners, omnidirectional scanners including raster scanners, and single line scanners. Alternatively, the optical reader may be a solid-state imager, including CMOS imagers and charge-coupled device (CCD) imagers, that can decode either one dimensional or two dimensional bar code symbols.

Figures 2, 3:
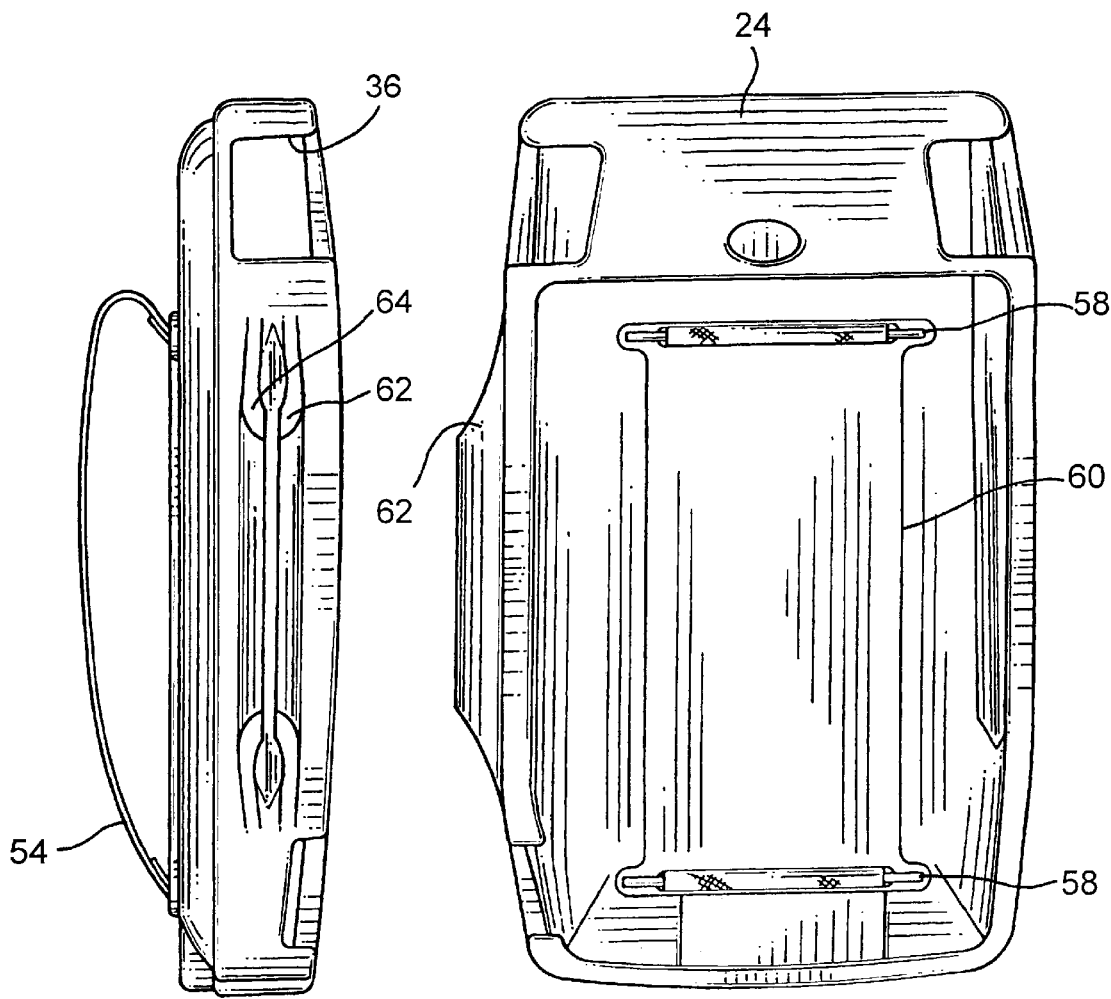
FIG. 2 is a side view of the FIG. 1 cover.
FIG. 3 is a front view of the FIG. 1 cover.

The protective cover optionally includes a strap 54, shown in FIG. 2, which is arranged to receive the hand of an operator while the operator grasps the protective cover and personal organizer from the rear. Strap 54 is a fabric web which is retained by loops passing around pins 56, 58, shown in FIG. 3, which are received in an interior recess of the shell 12.

Figure 4:
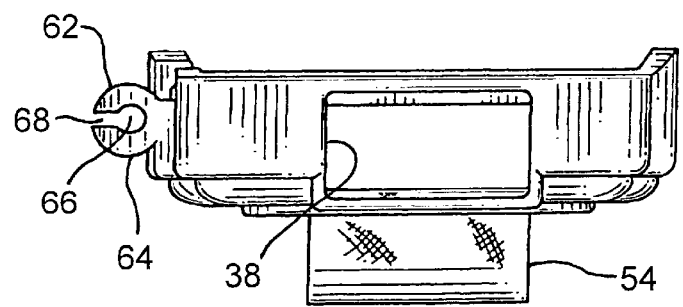
FIG. 4 is a bottom view of the FIG. 1 cover.

The protective cover of the invention may optionally include an extension for receiving and holding a stylus 70, shown in FIG. 5, which is used with the personal organizer 31 for manual entry of data. As illustrated in FIGS. 2, 3 and 4, the extension includes parts 62 and 64 which are integrally formed of the resilient material forming shell 12, and surround a cylindrical bore 66 having a slot 68. Bore 66 has a diameter which is smaller than the maximum diameter of stylus 70, such that slot 68 is extended to resiliently retain stylus 70.

The protective cover of the present invention advantageously allows convenient access by the operator to operation buttons 28 and viewing of screen 30 as well as operation of the optical reader while the resilient cover is in place. By substantially surrounding the side, top and bottom surfaces of the of the organizer, including the side, top and bottom edges of the front surface, protective cover 10 enables the organizer to withstand impact not only from a flat surface, such as a floor, but also the damaging impact of an edge of the organizer against another edge, such as the edge of a step or shell or a wrung of a ladder. Accordingly, maximum protection consistent with functional use of the device is provided for use in actual operating conditions, such as a retail establishment or a warehouse.

While there has been described what is believed to be the preferred embodiment of the invention, those skilled in the art will recognize that other and further modifications may be made thereto without departing from the spirit of the present invention, and it is intended to claim all such changes and modifications as fall within the true scope of the invention.

We claim:

1. A single piece protective cover for protecting a hand-held bar code reading device, said device having a housing defined by a front surface, a rear surface, two side surfaces and top and bottom end surfaces, said device including a connector at one of said end surfaces, an optical reader integrated inside said device and positioned on a second end surface opposite said connector, and a display and operating buttons on said front surface, said protective cover being separable from said device housing as a single unit and comprising a shell of resilient material, having a generally closed rear wall, side walls and top and bottom walls interiorly conforming to the corresponding surfaces of said device housing and a front wall having an opening allowing access to said operating buttons and viewing of said display, said front wall further having a peripheral portion substantially surrounding said opening and forming an interior recess for receiving said side, top and bottom surfaces of said device housing and for enclosing said side, top and bottom surfaces of said device housing, said peripheral portion being integral with said side walls and extending over substantially all peripheral edges of said front surface, said rear wall being integrally formed with the side walls and top and bottom walls and said rear wall covering a substantial portion of the rear surface of said device housing, and one of said top and bottom walls having an opening to allow use of said optical reader.

2. A protective cover as specified in claim 1 wherein said shell is formed of a single molded structure.

3. A protective cover as specified in claim 1 wherein said cover further includes a resilient exterior extension for receiving and holding a stylus.

4. A protective cover as specified in claim 1 wherein said cover further includes a loop carried by said rear wall of said shell.

5. A protective cover as specified in claim 1 wherein said cover has a thickness in the range of one-eighth to three-eighths of an inch.

6. A protective cover as specified in claim 1 further including an opening in an end wall allowing access to said connector.

7. The hand-held bar code reading device of claim 1 wherein said optical reader is a laser-based bar code scanner, including non-retroreflective and retroreflective scanners, omnidirectional scanners including raster scanners, and single line scanners.

8. The hand-held bar code reading device of claim 1 wherein said optical reader is a solid state imager.

9. The hand-held bar code reading device of claim 1 wherein said optical reader reads two dimensional bar code symbols.

10. A single piece protective cover for protecting a hand held terminal, said terminal having a housing defined by having a front surface, a rear surface, two side surfaces and top and bottom end surfaces, said terminal including a connector at one of said end surfaces and a display and operating buttons on said front surface said protective cover being separable from said terminal housing as a single unit and comprising a shell of resilient material, having a generally closed rear wall, side walls and top and bottom walls interiorly conforming to the corresponding surfaces of said hand held terminal housing and a front wall having an opening allowing access to said operating buttons and viewing of said display, said front wall further having a peripheral portion substantially surrounding said opening and forming an interior recess for receiving said side, top and bottom surfaces of said terminal housing, said peripheral portion being integral with said side walls and extending over substantially all peripheral edges of said front surface, said rear wall being integrally formed with the side walls and top and bottom walls and said rear wall covering a substantial portion of the rear surface of said terminal housing.

11. A protective cover as specified in claim 10 wherein said shell is formed of a single molded structure.

12. A protective cover as specified in claim 10 wherein said cover further includes a resilient exterior extension for receiving and holding a stylus.

13. A protective cover as specified in claim 10 wherein said cover further includes a loop carried by said rear wall of said shell.

14. A protective cover as specified in claim 10 wherein said cover has a thickness in the range of one-eighth to three-eighths of an inch.

15. A protective cover as specified in claim 10 further including an opening in an end wall allowing access to said connector.

16. A protective cover as specified in claim 15 for use with a hand held terminal having an optical reader on an end surface opposite said connector, said shell having an opening in a second end wall to allow use of said optical reader.

17. A single piece protective cover for protecting a hand held terminal, said cover comprising:

a shell of resilient material, having a generally closed rear wall, side walls and top and bottom walls interiorly conforming to the corresponding surfaces of a housing of said hand held terminal and a front wall having an opening allowing access to an operating button and viewing of a display of said hand held terminal, said front wall further having a peripheral portion substantially surrounding said opening and forming an interior recess for receiving a side, a top and a bottom surfaces of the housing of said hand held terminal and for enclosing said side, top and bottom surfaces of the housing of said hand held terminal, said peripheral portion being integral with said side walls of said protective cover and extending over substantially all peripheral edges of said front surface of the housing of said hand held terminal, said rear wall being integrally formed with the side walls and top and bottom walls and said rear wall covering a substantial portion of the rear surface of said hand held terminal, and said protective cover being separable from the housing of said hand held terminal as a single unit.

* * * * *